Sept. 9, 1947.  W. B. ZERN  2,427,081
WORK CLAMP AND TEMPLATE HOLDER FOR HINGE-SEAT CUTTING
Filed July 12, 1944    7 Sheets-Sheet 1

INVENTOR.
Warren B. Zern
BY Victor J. Evans & Co.
ATTORNEYS

Sept. 9, 1947. W. B. ZERN 2,427,081
WORK CLAMP AND TEMPLATE HOLDER FOR HINGE-SEAT CUTTING
Filed July 12, 1944 7 Sheets-Sheet 2

INVENTOR.
Warren B. Zern
BY *Victor J. Evans & Co.*
ATTORNEYS

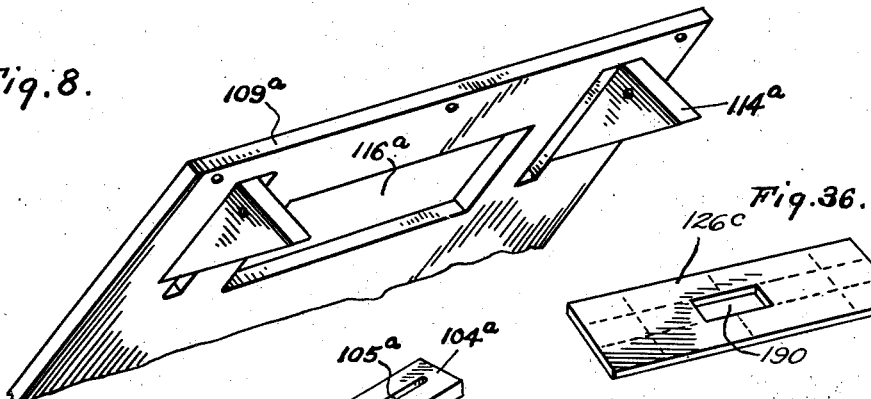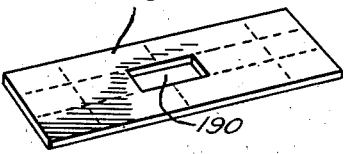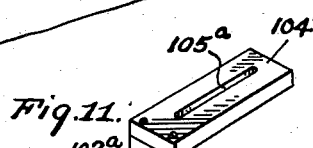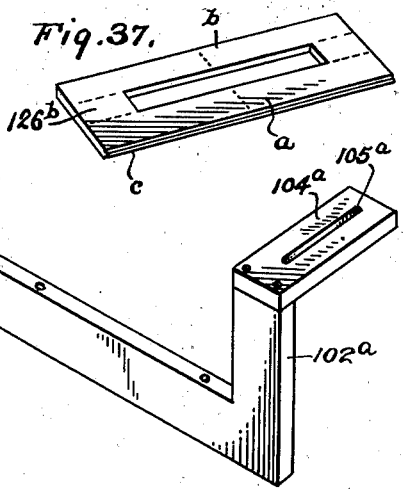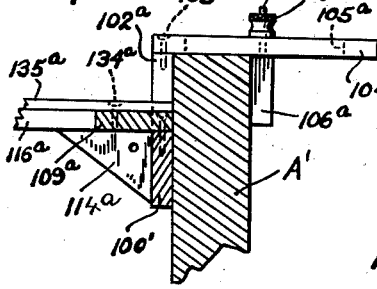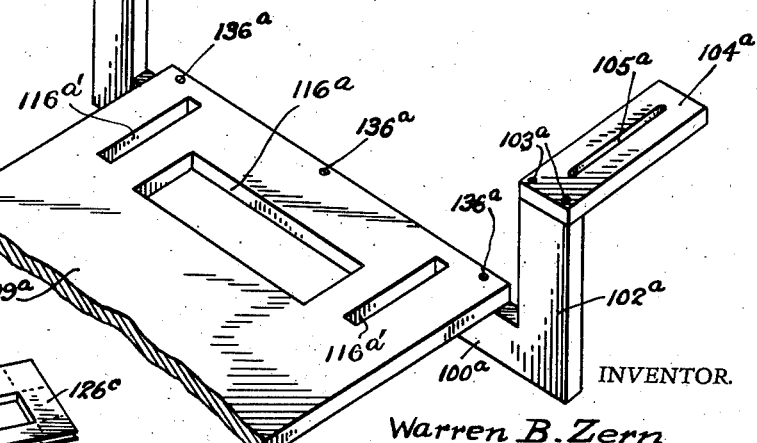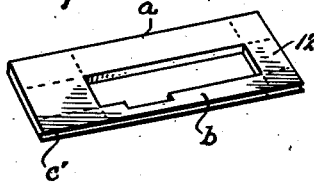

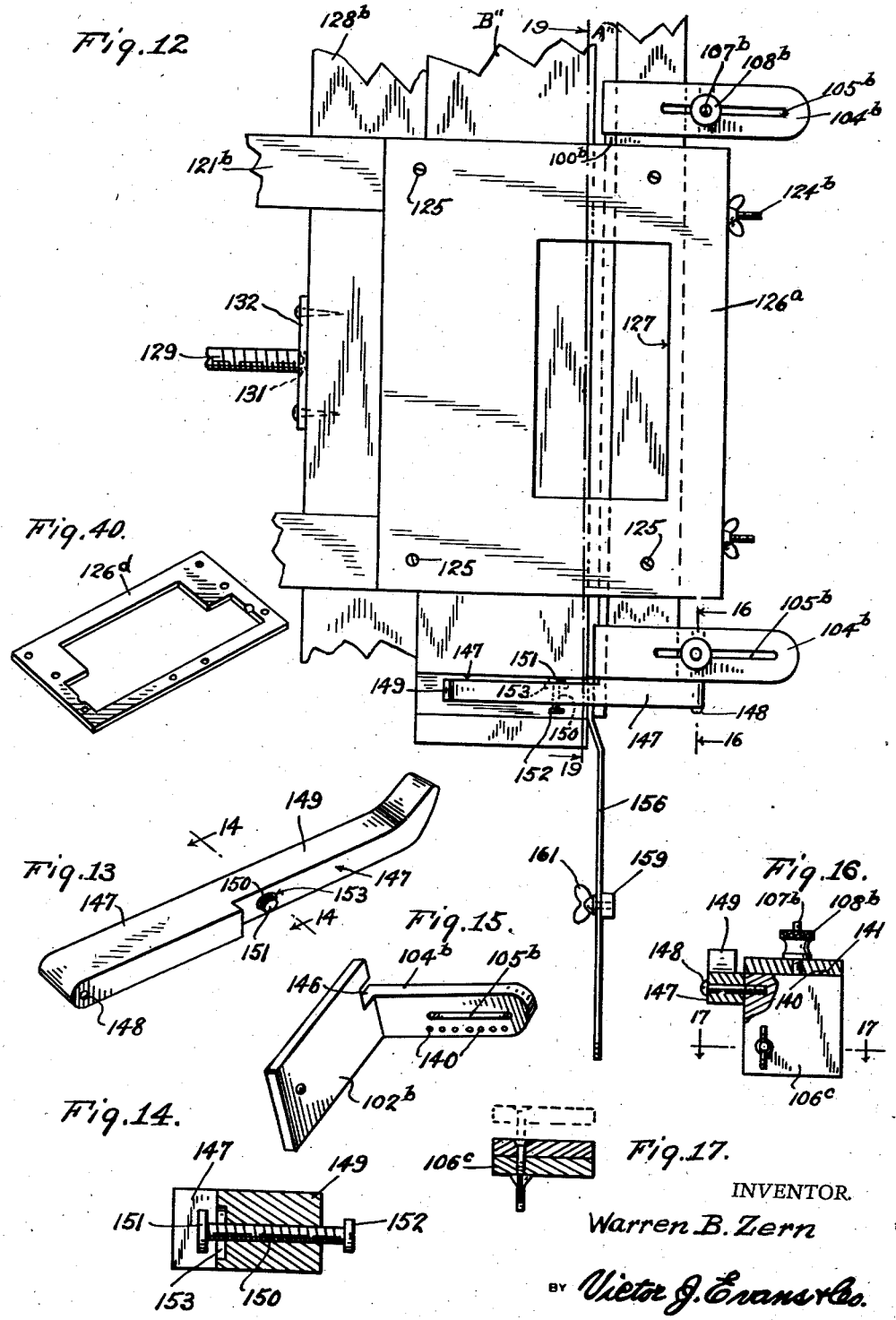

Sept. 9, 1947.  W. B. ZERN  2,427,081
WORK CLAMP AND TEMPLATE HOLDER FOR HINGE-SEAT CUTTING
Filed July 12, 1944  7 Sheets-Sheet 5
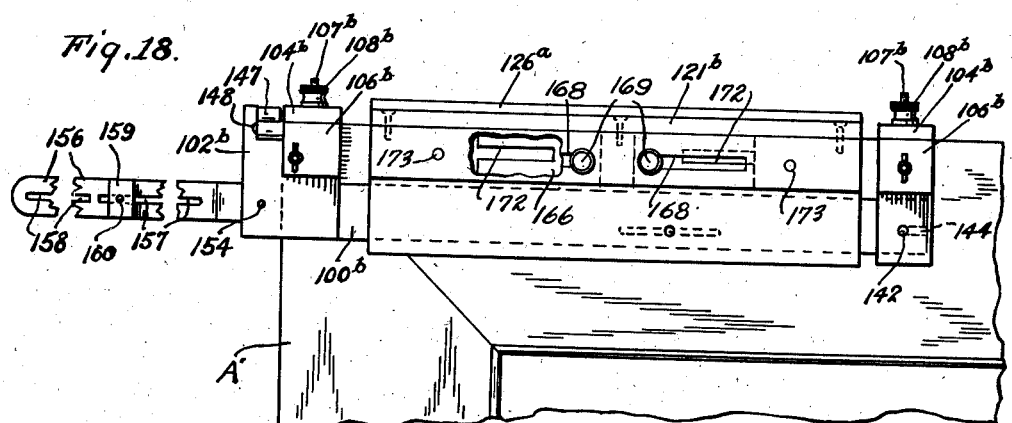
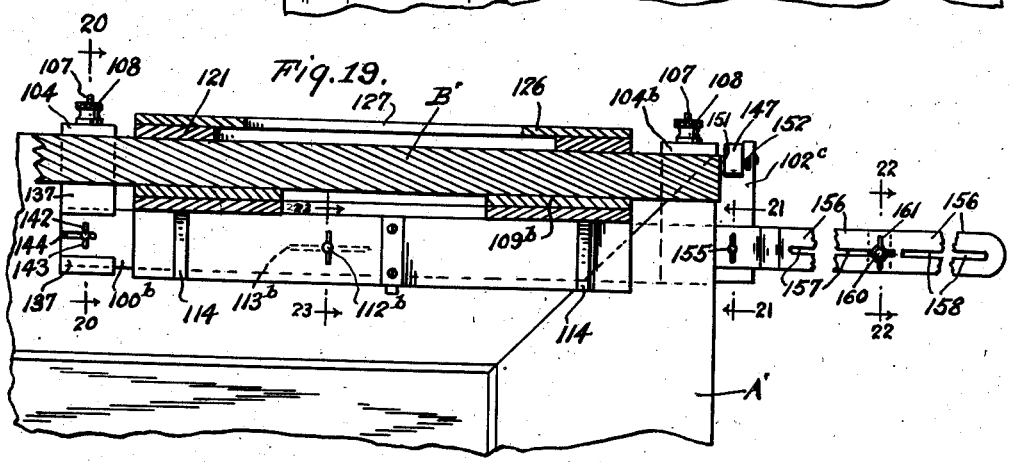
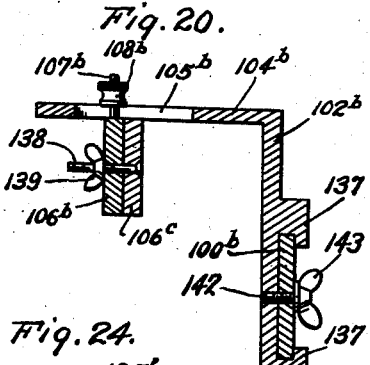
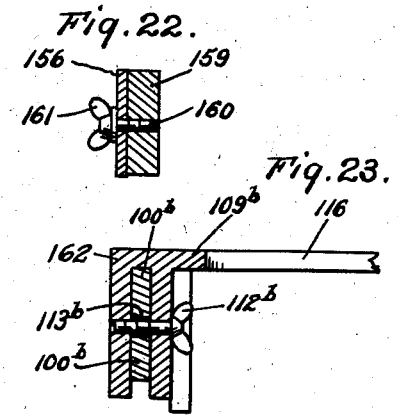
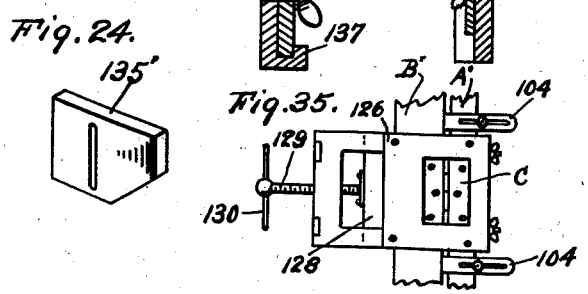
INVENTOR.
Warren B. Zern
BY Victor J. Evans & Co.
ATTORNEYS Sept. 9, 1947. W. B. ZERN 2,427,081
WORK CLAMP AND TEMPLATE HOLDER FOR HINGE-SEAT CUTTING
Filed July 12, 1944 7 Sheets-Sheet 6
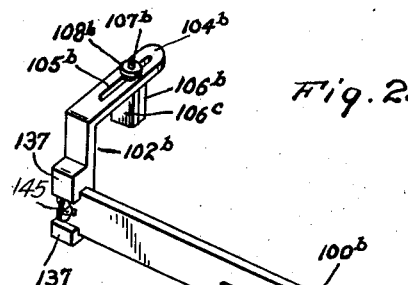
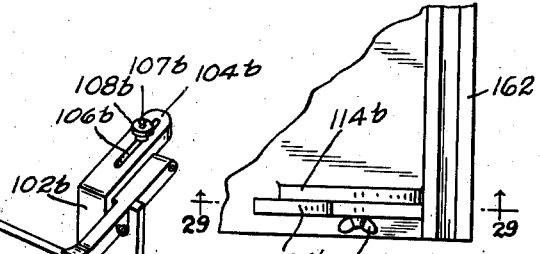
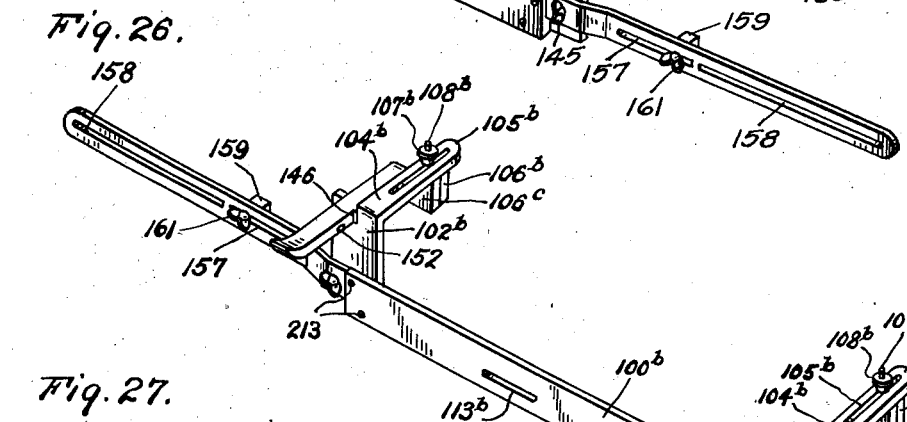
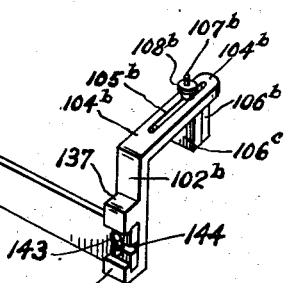
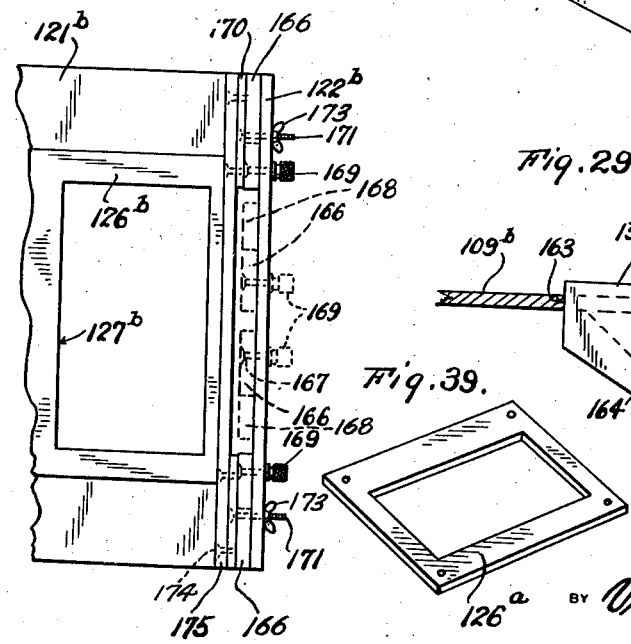
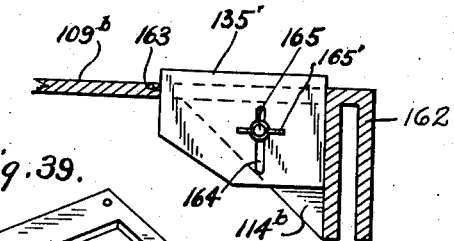
INVENTOR.
Warren B. Zern
BY Victor J. Evans & Co.
ATTORNEYS

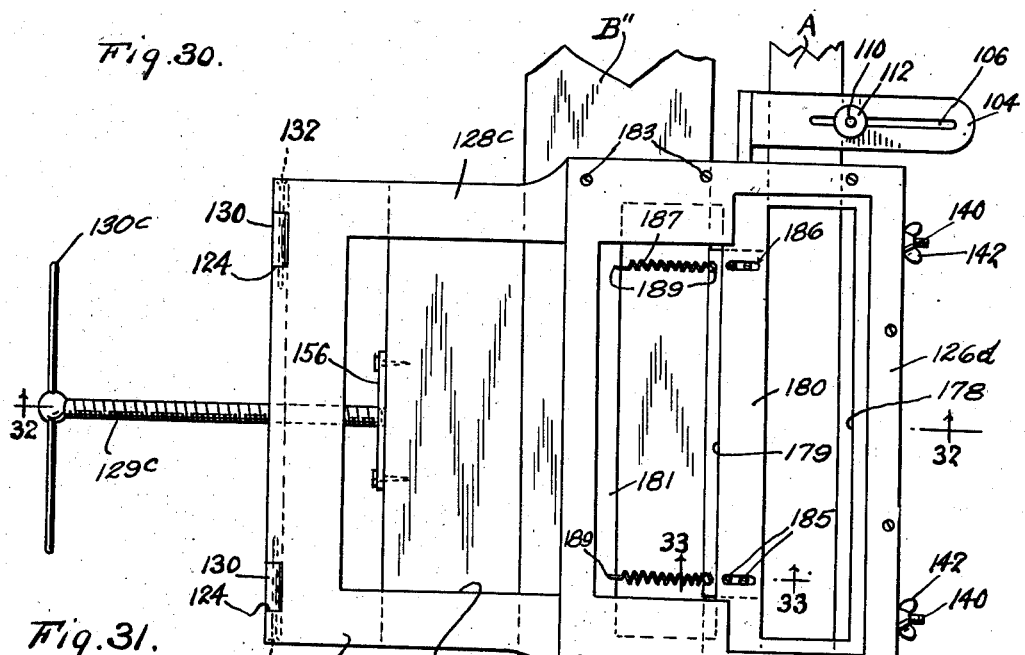

Patented Sept. 9, 1947

2,427,081

UNITED STATES PATENT OFFICE 2,427,081

WORK CLAMP AND TEMPLATE HOLDER FOR HINGE-SEAT CUTTING

Warren B. Zern, Pottstown, Pa.

Application July 12, 1944, Serial No. 544,527

8 Claims. (Cl. 144—27)

1

This invention appertains to wood working apparatus generally, and has for one of its several objects, the provision of a type thereof, that is designed to permit of the performance of certain wood working operations in an expert manner, and with precision, by persons who may have but little, if any, skill in the art, and with a facility substantially equal to that of the skilled mechanic.

Another object of the invention has to do with the provision of a fixture and jig to facilitate the pre-fabrication of doors and their companion casing parts or styles, the same permitting of precision in the location and formation of gains and mortises therein, for ease in the application of hinges and locks, and the quick installation of the doors and their casings and styles, upon delivery on a job.

A further object of the invention lies in the provision of a combined work clamp and template holder of the kind specified, which has the advantage of securely retaining a door and a companion casing part or style accurately aligned for the simultaneous gaining of the same to receive the hinges by which the door is to be hung from the style, and, likewise, for mortising of the door and the opposite casing part or style for the reception of a lock and its keeper or striker.

Another object of the invention is to provide the combined fixture and jig with gage means to facilitate the positioning of the same relatively to predetermined or specified locations for the installation of hinges and locks on doors and their companion casing parts or styles, and other gage means for determining proper clearance allowances between the doors and the casing parts and styles.

With these and other objects and advantages in view, the invention resides in the certain new and useful combination, construction, and arrangement of parts, as will be hereinafter more fully described, set forth in the appended claims, and illustrated in the accompanying drawings, in which:

2

Figure 1:
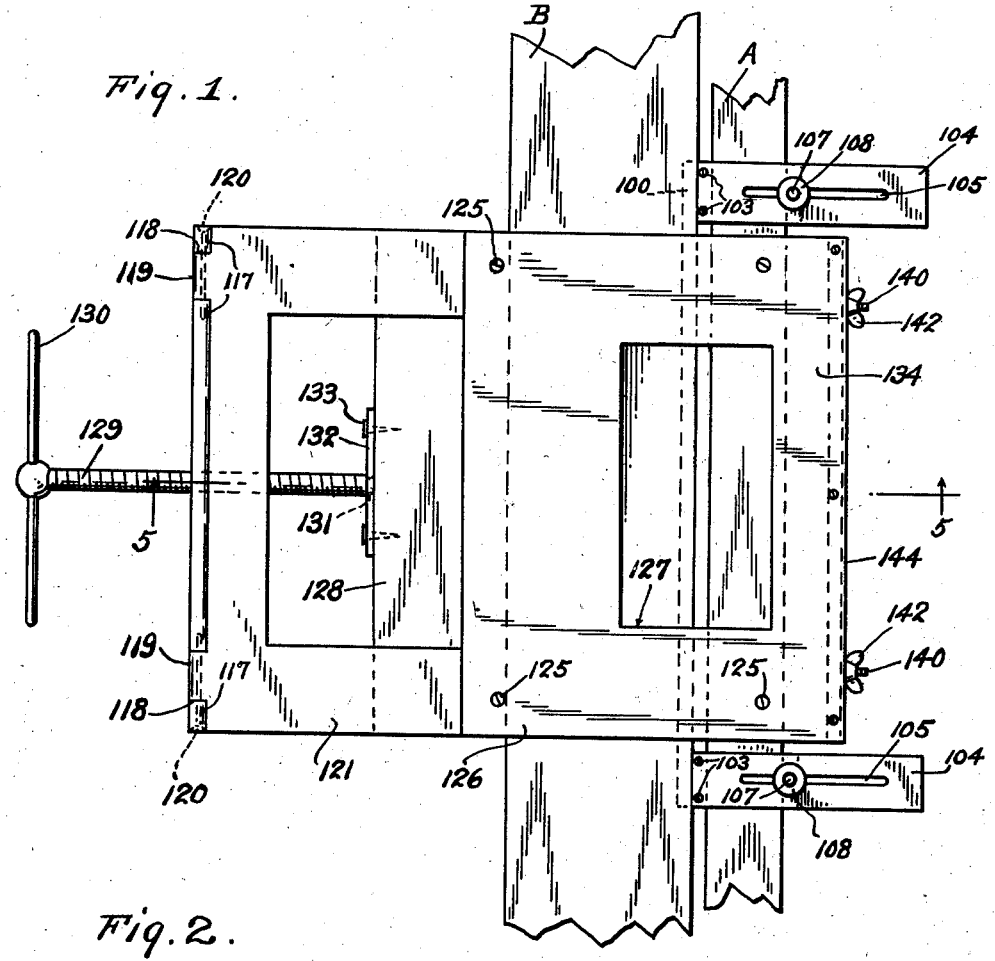
Figure 1 is a top plan view of the combined fixture and jig structure in a set position relatively to a door and a companion casing part or style, in accordance with the invention.
Figure 2:
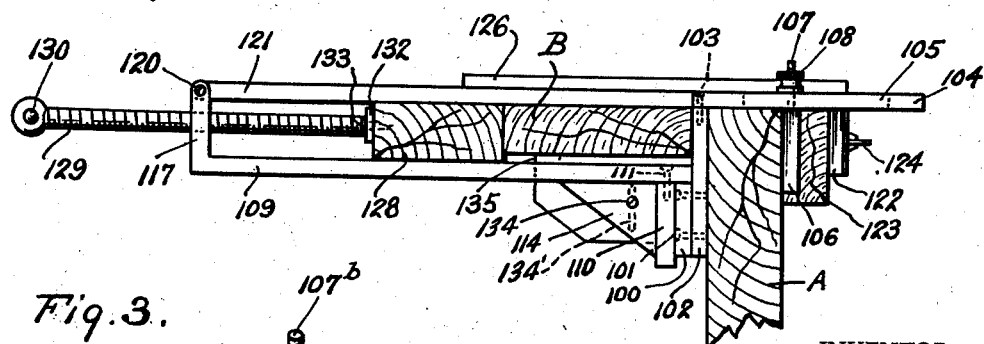
Figure 2 is a side elevation thereof.
Figure 3:
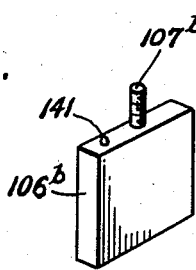
Figure 3 is a perspective view of one of the adjustable door clamping elements.
Figure 4:
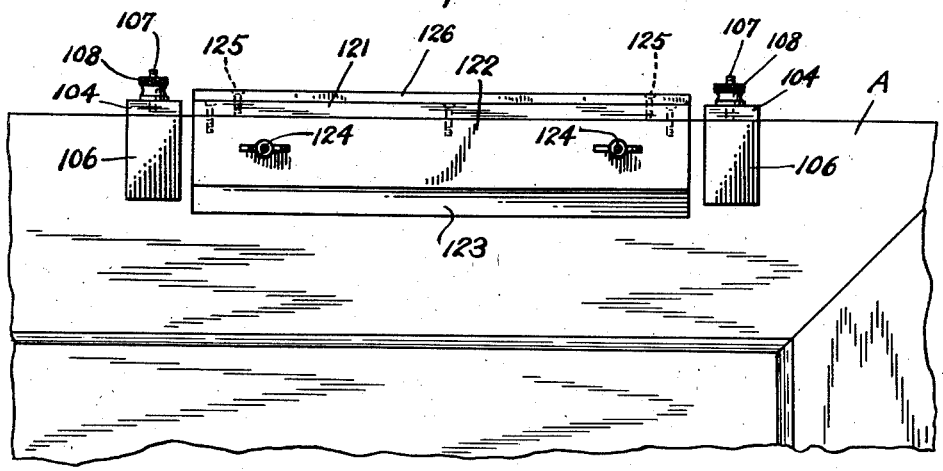
Figure 4 is a front elevation.
Figure 5:
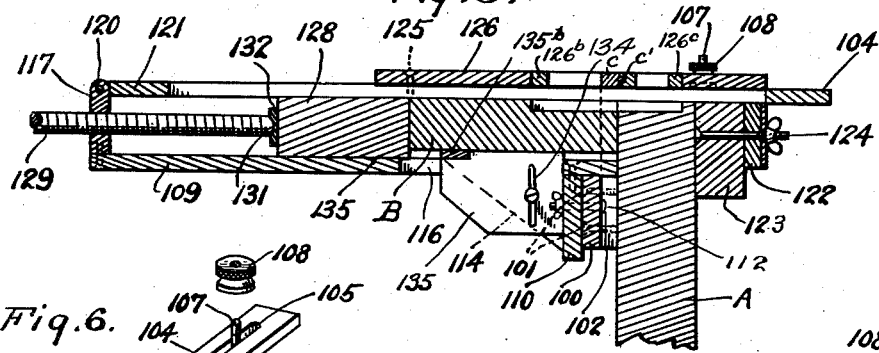
Figure 5 is a vertical section, taken through the line 5—5 on Figure 1.
Figure 6:
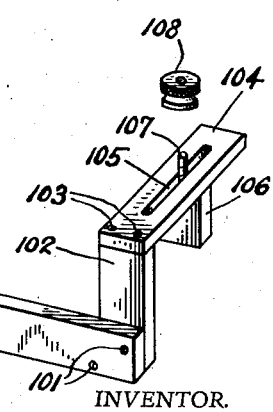
Figure 7:
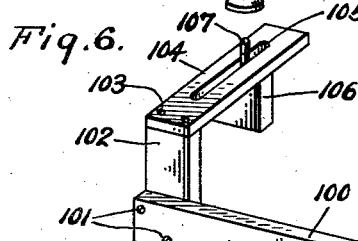

Figure 6 is a perspective view of the door clamping fixture upon which the jig structure is mounted;

Figure 7 is an enlarged fragmentary sectional detail;

Figure 8 is a perspective view of a slightly modified baseplate of the jig structure, looking toward its lower side;

Figure 9 is a fragmentary perspective view, showing the baseplate of Figure 8 in its secured relation with a slightly modified form of door clamping fixture;

Figure 10 is a fragmentary sectional detail;

Figure 11 is a perspective view of the modified form of the door clamping fixture per se;

Figure 12 is a fragmentary top plan view of the fixture and jig structure, and showing its modification for the addition thereto of a gage means for accurately locating the same, relatively to the top and bottom edges of the door and its companion casing part or style, for the formation of complemental hinge receiving gains therein;

Figure 13 is a perspective view of the gage element for locating the fixture and jig structure relatively to the top end edges of the door and its companion casing part or style;

Figure 14 is a cross section, taken through the line 14—14 on Figure 13;

Figure 15 is a perspective view of an end of the door clamping fixture, modified for the mounting of the gage means thereon;

Figure 16 is a sectional detail, partly in elevation, taken through the line 16—16 on Figure 12;

Figure 17 is a horizontal section, taken through the line 17—17 on Figure 16;

Figure 18 is a front elevation of the modified fixture and jig structure, showing the gage means mounted thereon;

Figure 19 is a vertical transverse section, taken through the line 19—19 on Figure 12;

Figure 20 is an enlarged sectional detail, taken through the line 20—20 on Figure 19;

Figure 21 is another sectional detail, taken through the line 21—21 on Figure 19;

Figure 22 is yet another sectional detail, taken through the line 22—22 on Figure 19;

Figure 23 is still another sectional detail, taken through the line 23—23 on Figure 19;

Figure 24 is a perspective view of one end of the adjustable member for levelling the casing part or style with the uppermost edge of the door;

Figure 25 is a perspective view of the door clamping fixture and the attached gage means, looking from the rear, the jig structure being removed;

Figure 26 is a view similar to that of Figure 25, but looking from the front;

Figure 27 is a fragmentary bottom plan view of the template carried frame of the jig structure, showing the adjustable securing means therefor;

Figure 28 is a fragmentary bottom view of the base-plate of the jig structure, showing one of the means for adjusting the member for levelling the casing part or style relatively to the juxtapositioned edge of the door;

Figure 29 is an inverted sectional detail, taken through the line 29—29 on Figure 28;

Figure 30 is a top plan view of a further modified form of the fixture and jig structure;

Figure 31 is a perspective view of a spacer bar for gaging a hinging clearance between a casing part or style and the opposed side of the door;

Figure 32 is a vertical longitudinal section, taken through the line 32—32 on Figure 30;

Figure 33 is an enlarged fragmentary sectional detail, taken through the line 33—33 on Figure 30;

Figure 34 is a perspective view of the casing part or style levelling member per se;

Figure 35 (Sheet No. 5) is a reduced top plan view of the fixture and jig structure operatively related to a door and its companion casing part or style, and showing the securement of a butt hinge in the complemental gains, after their formation, the hinge being emplaced therein by insertion through the gain gaging opening in the template carried by the jig;

Figure 36 (Sheet No. 3) is a perspective view of one form of template blank;

Figure 37 is a view similar to that of Figure 36, but showing the blank modified to completed form for guiding a routing tool in the formation of a lock mortise;

Figure 38 is another similar view, but showing a complemental template for use in the formation of a gain or mortise for the lock keeper or striker;

Figure 39 (Sheet No. 6) is a perspective view of the template holder per se;

Figure 40 (Sheet No. 4) is a perspective view of a modified form of the template holder.

Referring to the drawings, wherein like characters of reference denote corresponding parts throughout the several views, the embodiment of the invention, as it is exemplified therein, is generally comprised in a work clamp fixture and a jig carried template, assembled into a substantially unitary structure, somewhat in the manner of the like structure, described and illustrated in my copending application for Letters Patent of the United States, entitled Wood working apparatus, filed on the 29th day of May, 1942, Serial No. 445,049, issued Aug. 8, 1944, as Patent No. 2,355,603, of which the present application is a continuation in part. In the present instance, however, the fixture and jig assembly is applied directly to the work, i. e., complemental structural units, such as a door and its companion casing parts or styles, apart from any particular or special type of supporting stand or guide structure.

As shown in Figures 1 through 8, the fixture is comprised in an elongated angular frame, formed of a horizontal bar 100, having relatively short vertical bars 102 rising from its ends, and horizontal arms 104 extending at right angles from the top ends of the vertical bars 102. As best shown in Figure 6, the lower ends of the vertical bars 102 are here secured, as by screws 101, to one side of the ends of the horizontal bar 100, and the inner ends of the arms 104, to the top ends of the vertical bars, as by screws 103. Each of the arms 104 is longitudinally slotted, as at 105, to receive upwardly through the same a threaded stud 107, projecting from the center of the top edge of a substantially rectangular clamp element 106. A nut 108 is engaged on the stud 107, to secure the clamp element 106 in adjusted parallel relation to the complemental of the vertical bars 102 and in clamping relation to the opposed side of a door A, when the fixture is seated over a side edge of the door.

Extending rearwardly from the inner side of the fixture, is a horizontally disposed base-plate 109, of the jig structure, that has its front end edge resting upon the top edge of the horizontal bar 100 of the fixture. A parallel bar 110 is secured, as by screws 111, to the under side of the base-plate 109, and is abutted against the inner side of the horizontal bar 100, it being connected to the latter for lateral adjustment by means of a bolt 112, engaged through a longitudinal slot 113, formed centrally in the horizontal bar 100. This parallel bar 110 is braced at its inner side, by a pair of angled brace elements 114, secured, as by screws 115, to the under side of the base-plate 109; one spaced from an adjacent end of a transversely elongated opening 116 or 116a (Figures 5 and 8 through 10), in the latter. Rising from the rear end edge of the base-plate 109, is a flange 117, which has its top edge lying substantially in the plane of the top faces of the arms 104 of the fixture, and recesses 118 therein for the reception of hinge elements 119, formed at the rear end edge of a flat carrier frame 121, the hinge elements being engaged on pintles 120, passing inwardly of the ends of the flange 117 and through the recesses 118. The carrier frame 121 has a length to extend forwardly from the hinge connections, above the base-plate 109 and between the arms 104, to a point beyond the outer side of the door A, upon the uppermost side edge of which it rests, when operatively disposed and the fixture has been clamped in place thereon; the door edge being firmly held against the outer faces of the vertical bars 102 by the clamp elements 106; the opening in the carrier frame 121 also extending beyond the outer side of the door. Depending from the front end edge of the carrier frame 121, is a flange 122 which supports a clamp bar 123 at its inner side for engagement with the outer side of the door, the clamp bar being detachably mounted on the flange by means of a pair of spaced thumb screws 124, the headed ends of the latter being countersunk flush with the inner face of the clamp bar.

Detachably secured, as by screws 125, on the top side of the carrier frame 121, is a rectangular template 126, which overlies the forward portion of the frame opening and has its forward edge disposed flush with the front end edge of the carrier frame. The template 126 is provided with an opening 127, conforming in size and shape to an open hinge, such as is commonly used for the hanging of doors, through which a cutting tool, such as a power driven routing tool (not shown), is inserted and guided in the performance of its work. For this purpose, the template 126 is positioned so that a proper area of the opening 127 exposes through the same a predetermined area of the top edge of the door A for the forming of a gain to receive a complemental leaf of the hinge.

In order to similarly recess a companion casing part or style B, the same is laid lengthwise across the base-plate 109, beneath the carrier frame 121, in abutted relation to the inner faces of the vertical bars 102, of the fixture, in which position, it is firmly held by means of a clamp or pressure bar 128, which is forcibly engaged with its inner side edge by a screw 129, that is threaded forwardly of and centrally through the upstanding flange 117, at the rear end of the base-plate 109; the thickness of the vertical bars 102, of the fixture, providing a proper hinging clearance between the casing part or style B and the opposed side of the door A. The rearwardly directed end of the screw 129 is provided with an operating handle 130, while its forwardly directed end has bearing in a recess 131, formed in the outer face of a wear plate 132, that is secured, as by screws 133, to the rear side edge of the clamp or pressure bar 128. Secured, as by screws 134, on the inner side of each of the brace elements 114, is an elevator element 135, which is vertically slotted, as at 134' (Figure 2) for adjustment on the screws 134 and inwardly of and adjacent to the ends of the opening 116 to support the style B with its upper surface flush with the top side edge of the door A. These elevator elements 135 are connected together for simultaneous adjustment by a cross bar 135b and are displaced from beneath the style, whenever a style of a greater thickness, than that of the one shown, is to be employed. Thus, with the template 126 positioned on the carrier frame 121 as before stated, its opening 127 will overlie complemental areas of the door edge and the style for the simultaneous routing out of gains for both of the leaves of a hinge.

In Figures 8 through 11, a modified form of fixture is illustrated and, here, the horizontal bar 100a is made integral with the vertical bars 102a, to the top ends of which, the arms 104a are secured, by the screws 103a. The arms 104a have the slots 105a to receive the studs 107a of the clamp elements 106a; the studs having nuts 108a to secure the latter against the outer side of the door A'. In this instance, the base-plate 109a has its forward end edge secured, as by screws 136a, to the top edge of the horizontal bar 100a, with the angled brace elements 114a bearing directly against the inner side of the latter, as shown in Figure 10. Also, the base-plate 109a is provided with the elevator elements 135a for leveling the style B' with the top edge of the door. In this form of the fixture and jig, the template 126, on the carrier frame 121, is employed as, or replaced with, a template holder 126a, such as is shown in Figure 39, (Sheet No. 6), which serves to retain a pair of complemental templates 126b and 126c, such as are illustrated in Figures 37 and 38 (Sheet No. 3), for the mortising of the door and style simultaneously for the reception of a lock and its keeper or striker, respectively.

In the use of either of these forms of fixtures and jigs, one or the other of the fixtures will be engaged over the upper edge of the door, with the door supported from the floor in sidewise upright position by any suitable means, and the clamp elements 106 adjusted in the slots 105 to firmly abut the outer side of the door. With the fixture thus emplaced, the carrier frame 121 is raised on its hinge connections sufficiently for the laying of the style B across the base-plate 109, or upon the leveling elements 135, as the case may be, in juxtaposition to the door and in abutting relation with the inner sides of the vertical bars 102, of the fixture frame, which bars 102 preferably have a thickness to space the style from the adjacent side of the door, at a distance to provide a proper clearance therebetween, when the door and style are installed. Following this, the carrier frame 121 is lowered onto the top surfaces of the door and style and the clamp bar 123, carried by the flange 122, is tightened against the outer side of the door by a manipulation of the thumb screws 124. The screw 129 will now be turned from the handle 130 to tighten the pressure bar 128 against the inner side edge of the style. With the parts in this state, a routing tool applied through the opening 127, in the template 126, will accurately form the gains for the seating of a hinge therein, upon the removal of the fixture and jig from the work. As before stated, by substituting the complemental templates of Figures 37, 38, for the template 126, the mortises for the reception of a lock and its keeper or striker (not shown) can, by the use of the routing tool, be readily and accurately formed in the opposite side edge of the door and a style complemental thereto, it being understood that door will be reversed from its initial sidewise upright position for the purpose.

In substituting the template holder 126a (Figure 39) for the template 126, separate templates 126b (Figure 37) and 126c (Figure 38) are employed; the template 126b for the formation of a mortise for a lock and the template 126c for its keeper or striker, and these are juxtapositioned within the opening in the template holder in proper relation to overlie the edge of the door and the top surface of the style, respectively. The tool guide openings in the templates are preferably formed off center, with respect to the longitudinal edges thereof, so that one side portion $a$ of each is wider than the opposite side portion $b$. By this arrangement, the templates may be positioned with the opening of the template holder in a reversed order, correspondingly for use with doors of the two standard thicknesses, so that the mortises will be formed in their proper relative positions. To prevent any tendency of the templates 126b, 126c, to buckle, during tool operation, the opposed edges thereof are tongued and grooved, as at $c$ and $c'$, respectively.

Referring now to Figures 12 through 29, a modified form of fixture and jig is provided, wherein a door A" and a companion style B" may be pre-fabricated, i. e., gained and hinged together, prior to the removal of the fixture and jig from each set position; each hinge being inserted inwardly through the template opening, as in Figure 35 (Sheet No. 5), and secured in a usual manner within the complemental gains to that end and the fixture made with an angled door clamping part that is detachable from an end of the horizontal bar 100b to permit of its disengagement from about a hinge for its removal from the work.

In this instance, the horizontal bar 100b has one of its ends detachably engaged within the opposed channels of a pair of oppositely angled lugs 137 (Figure 20), formed on the inner side of one of the vertical bars 102b, each of which has its upper end provided with the angled arm 104b, that is slotted, as at 105b, to receive the stud 107b of the clamp element 106b, the stud having a nut 108b to secure the clamp element against the outer side of the door A', as in the first instance, except that the clamp bar 123 is omitted. The clamp element 106b may be employed alone, when the fixture is mounted on a door of the greater thickness, and with a supplemental clamp element 106c, when the fixture is mounted on a door of the lesser thickness, the latter element being secured against the inner side of the element 106b by means of a screw 138 extending through the same and projecting outwardly through an aperture in the element 106b, to receive a winged clamp nut 139. Formed on the under side of each of the arms 104b, parallel to the slot 105b, is a series of indentations 140 (Figure 15), which are engaged by a lug 141 on the top side of the clamp element 106b (Figure 3), at any position of adjustment of the latter, to hold the same and the supplemental element 106c, when employed, from turning on the stud 107b, during the tightening up of the nut 108b.

The vertical bar 102b, of the detachable angled part of the fixture, is apertured to receive a clamp screw 142, extending between the lugs 137, for engagement with a slot 144, opening through the end of the horizontal bar 100b (Figure 26), the screw having a winged nut 143 threaded on its inner end to secure the angled part in place. The opposite end of the horizontal bar 100b is secured, as by the screws 213, to the inner side of the other of the vertical bars 102b, which is made wider than in the first instance, to provide an outwardly offset portion that has a notch 146 in its top edge, immediately adjacent the arm 104b, to seat a gage bar 147 (Figure 13) which is pivoted, as at 148 (Figure 18), to the outer side of the arm 104b and normally extends rearwardly through the notch 146 and crosswise of the top ends of the door A'' and the style B''. The free end of the gage bar 147, beyond the point of its seating in the notch 146, is cutaway at its inner side, as at 149, to a depth equal to a maximum width of clearance to be allowed between the top edge of the door and the header of the casing in which the door is to be hung. Thus, when seated in the notch 146, the inner side of the thicker part of the gage bar 147 is abutted by the top edge of the door, while the top edge of the style abuts the parallel face of the cutaway portion 149. In order to vary the width of the clearance allowance, an adjustable gage is mounted transversely of the outer reduced or cutaway portion 149 and is comprised in a screw 150, having a circular foot-piece 151 to be abutted against the opposed edge of the style, when the screw is turned in proper direction for the purpose, a kerfed head 152 (Figure 26) being provided on the opposite or outer end of the screw for its manipulation by hand or tool. If the maximum clearance is necessary of allowance, the foot-piece 151 seats within a recess 153, formed in the face of the cutaway portion 149, when the screw 150 is turned in a reversed direction.

In connection with the location of hinges on a door, it is to be here noted that, in modern architectural practice, the upper hinge is required to be mounted inwardly of the plane of the inner edge of the top cross rail of the door, and the lower hinge inwardly of the plane of the inner edge of the bottom cross rail thereof, the latter usually being substantially wider than the former. For locating the hinge gains to receive the lower hinge, therefore, a second gage is provided and, here, the fixed vertical bar 102b, below the notch 146 therein, is apertured, as at 154 (Figure 18), to receive a clamp screw 155 (Figure 21), for the securement thereto of an elongated bar 156, which extends in line with the horizontal bar 100b. This bar 156 is formed to provide a pair of aligned slots 157, 158 (Figure 26), extending longitudinally thereof, for the adjustable mounting of a gage element 159 in one or the other of the slots, the gage element 159 having a threaded stud 160 and a winged nut 161 (Figure 22), for its securement in a set position. When the fixture and jig structure is employed for the formation of the gains for a lower hinge, the gage bar 147 is swung on its pivot 148, clear of the notch 146, to a position to avoid interference with the proper mounting of the fixture and jig on the door edge and its adjustment thereon for a given setting of the gage element 159, for the location of the gain areas to receive the lower hinge.

As best shown in Figures 23 and 29, the base-plate 109b is supported from the horizontal bar 100b, by means of an inverted U-shaped channel member 162, depending from the under side of the front end edge of the base-plate and engaged over the horizontal bar 100b, between the vertical end bars 102b. The channel member 162 is adjustably secured to the horizontal bar 100b by a clamp bolt 112b, which is engaged in a slot 113b that is formed longitudinally and centrally of the latter. In lieu of the separate levelling elements 135 for the style B'', the same may be connected together by means of a bar 135b (Figure 34), the elements 135' (Figures 24 and 29) depending through slots 163 (Figure 29), formed in the base-plate beyond the opposite ends of the opening 116b. These levelling elements 135' are disposed at the inner sides of the angled brace members 114b, and are vertically slotted, as at 164, for the engagement therein of screws 165, carried by the brace members and having winged nuts 165' (Figure 29) on their outer ends to secure the elements in adjusted position. Thus, with the fixture engaged on a door and a style laid across the base-plate 109b and resting upon the bar 135b, the latter can be elevated to lift the style for the alignment of its top surface with the top edge of the door, by an adjustment of the guide members 135' relatively to the brace elements 114b, upon a loosening up on the nuts 165. When levelled, the style B', (Figures 12 and 19), will be clamped in place by the force applied on the pressure bar 128b by the screw 129, as before stated herein.

In order to adapt the fixture and jig for use on doors of two standard thicknesses, i. e., one and three-eighths inches and one and three quarters inches, and as shown in Figures 27, pairs of relatively movable spacer elements are mounted on the inner side of the flange 122b, of the carrier frame 121b, one pair at each end thereof, and each pair is comprised in a block or plate 166, that is carried on a clamp screw 167, which is adjustably engaged in a slot 168 (Figure 18), extending longitudinally in the flange 122b, the headed end of the screw being countersunk flush in the inner face of the block or plate and its threaded end provided with a knurled nut 169, to be tightened against the outer face of the flange. This block or plate 166 is normally positioned alongside a second block or plate 170, when the fixture is arranged for use with a door of the lesser thickness. This block or plate 170 is also carried on a clamp screw 171, that passes through a slot 172, formed horizontally in the block or plate 166, and outwardly of an aperture in the flange 122b, the inner headed end of the screw 171 being countersunk flush in the inner face of the block or plate 176 and its outer end provided with a winged nut 173, to be tightened against the outer face of the flange 122b, when the two blocks or plates are placed in registry. The slot 172 opens through the outer side edge of each of the blocks or plates 166, so as to allow the latter to be moved inwardly toward the center of the flange 122b, from in front of the blocks or plates 170, to positions substantially as shown in broken lines in Figure 27, when the fixture is to be arranged for use with a door of the greater thickness, and are thereafter drawn into contact with the inner face of the flange and alongside the blocks or plates 170, by the tightening of the nuts 169. Likewise, upon a tightening up of the nuts 173, a clamp bar 175 is moved toward the clamp bar 122b until its medial portion contacts the inner faces of the blocks or plates 166. This clamp bar 175 extends between the blocks or plates 170 and is secured to their inner faces by the screws 174 it being adapted to engage the outer side of the door A", when the carrier frame 121b is lowered onto the top surfaces of the door and the style B". When a door of a greater thickness is to be worked, the blocks or plates 166 will be displaced from in front of the blocks or plates 170, and secured in place between the same, and against the inner side of the flange 122b by a tightening up of the nuts 169, so that, when the nuts 173 are tightened up on the screws 171, the clamp bar 175 will be drawn toward the flange 122b a sufficient distance away from the vertical bars 102b to provide a space therebetween to receive the door, in which position, the blocks or plates 170 will align with the blocks or plates 166. Shims 176 are placed between the ends of the clamp bar 175 and the blocks or plates 170, in order to facilitate the engagement of the door edge within the space so provided between the vertical bars 102b and the clamp bar 175.

In the form of the fixture and jig, as shown in Figures 30 through 34, which is particularly designed for the mortising of a door and its style for the installation of a lock and keeper or striker, the front half portion of the carrier frame 121c is made wider than the rear half portion thereof and is formed to provide two parallel, transversely elongated, openings 178, 179 (Figure 30), separated by a transverse bar 180, with the inner opening 179 separated, by a second transverse bar 181, from the opening 182 in the rear half portion. Detachably mounted, as with screws 183, is a template holder 126d (Figures 30 and 40), which is formed with a substantially T-shaped opening to receive complemental templates 126b, 126c (Figures 36 and 37), for the formation of the lock and keeper or striker mortises, respectively. In order to provide a proper door opening and closing clearance between the door and the style, a spacer bar 184 is to be interposed therebetween, prior to the tightening up of the pressure bar 128c and it has its lower side edges beveled, as at 184', to facilitate its insertion between the door and the style. The top side of the bar 184 is provided with spaced pairs of round headed screws 185 (Figures 30 and 33), which constitute guides that are cooperative with slots 186, formed in the transverse bar 180, of the carrier frame 121c. A pair of coil springs 187 extend between the inner side edge of the spacer bar 184 and the inner transverse bar 181, and these act to withdraw the spacer bar from its contact with the inner side of the door, when the pressure bar 128c is likewise withdrawn from contact with the inner side edge of the style, by the operation of the screw 129c from the handle 130c. The springs 187 each have one of their ends secured, as by a screw 188, in a recess, formed in the inner top edge of the spacer bar 184 and the other end thereof engaged, as at 189, through an aperture formed in the forward edge of the transverse bar 181.

As shown in Figures 36 and 37 (Sheet No. 3), the invention proposes that certain of the templates will be made and sold in the form of blanks, as at 126c (Figure 36), so that a user may elongate an initially formed slotted opening 190 to proper length, or size, as exampled in the template 126b (Figure 37), for the forming of a mortise to receive a particular length or size of lock.

Having thus fully described my invention, it is to be understood that any and all changes in design, construction and arrangement of parts, to which the disclosed fixture and jig structures are susceptible, may be resorted to, without departing from the spirit of the invention, or its scope as claimed.

What is claimed is:

1. In a device of the class described, a fixture adapted to be seated over the edge of a first structural unit, a base-plate bracketed from one side of said fixture, means carried by said fixture for supporting a second structural unit in juxtaposition to said first structural unit, a jig hingedly mounted on said base-plate and overlying both of said structural units, and a template carried by said jig in overlying relation to predetermined areas of said structural units to guide a routing tool over and about said areas for the formation of complemental gains or mortises therein.

2. In a device of the class described, a fixture adapted to be seated over and upon a side edge of a door, a base-plate bracketed horizontally from one side of said fixture to support a style in juxtaposition to said door edge, a jig extending horizontally above said base-plate and supported therefrom at one end and having its other end supported on the top surfaces of said door edge and said style, and a template mounted on said jig in overlying relation to predetermined areas of said structual units to guide a routing tool over and about said areas for the formation of complemental gains or mortises therein.

3. The deivce as in claim 2, with clamping means for securing said fixture in place on said door edge.

4. The device as in claim 2, with a clamp means mounted on said base-plate for holding said style in place relatively to said door edge, and other means on said base-plate for supporting said style so that its top surface lies flush in the plane of the surface of the door edge.

5. The device as in claim 2, with means carried by said fixture and interposed between opposed portions of said door and said style to provide a required clearance therebetween.

6. The device as in claim 2, with a gage means extending from one end of said fixture and cooperative with an end edge of said door for positioning the fixture on the side edge of the door to accurately align the template with the areas of the latter and of the style in which hinge receiving gains are to be formed.

7. The device as in claim 2, with the fixture comprised in a horizontal bar having upstanding angled members adapted to be engaged over a side edge of a door and adjustable elements carried by said angled members to clamp the door between the same and said horizontal bar.

8. In a device of the class described, a horizontal bar, upstanding angled members at the ends of said bar adapted to be engaged over a side edge of a door, adjustable elements carried by said angled members to clamp the door between the same and said horizontal bar, one of said angled members being detachable from said horizontal bar, an adjustable gage means extending horizontally from the fixed angle member in line with said horizontal bar, a second gage means pivotally mounted on the fixed angled member and extending horizontally at right angles to said adjustable gage means and crosswise of said horizontal bar when operatively disposed, a base-plate bracketed horizontally from said horizontal bar at the side thereof opposite from the angled members to support a style in juxtaposition to said door edge, means carried by said base-plate for clamping said style relatively to the door edge, a jig mounted on said base-plate and normally disposed to overlie the door edge and said style, means carried by said jig adapted to engage the outer side of said door between said angled members, and a template mounted on said jig and overlying predetermined areas of said door edge and said style to guide a routing tool over and about said areas for the formation of complemental gains or mortises therein.

WARREN B. ZERN.

REFERENCES CITED

The following references are of record in the file of this patent:

UNITED STATES PATENTS

| Number | Name | Date |
| --- | --- | --- |
| 724,966 | Strubel | Apr. 7, 1903 |
| 1,016,341 | Lowden | Feb. 6, 1912 |
| 1,524,234 | Carter | Jan. 27, 1925 |
| 1,619,695 | Boese et al. | Mar. 1, 1927 |
| 1,788,256 | Sherwin | Jan. 6, 1931 |
| 1,769,511 | Heston et al. | July 1, 1930 |
| 1,028,584 | McKnight | June 4, 1912 |
| 859,800 | Britton | July 9, 1907 |
| 1,022,883 | Seguin | Apr. 9, 1912 |